2 Sheets—Sheet 1
G. WILSON.
Case for Transporting Bottles and Bottled Liquids.
No. 8,011. Reissued Dec. 25, 1877.
*FIG. I.*
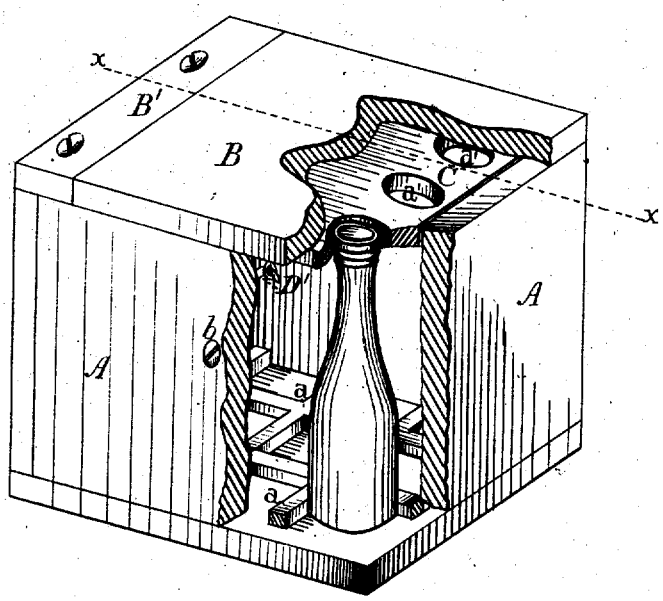
*FIG. II.*
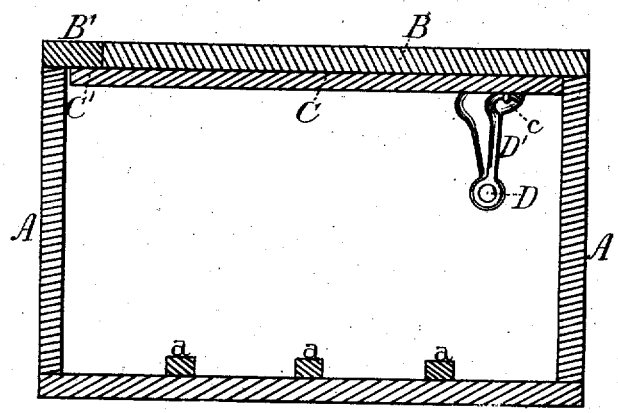
*WITNESSES:*
Chs. E. Lewis.
Geo R. Spedden
*INVENTOR.*
George Wilson
By Chas B. Mann
his Attorney.

2 Sheets—Sheet 2.
G. WILSON.
Case for Transporting Bottles and Bottled Liquids.
No. 8,011. Reissued Dec. 25, 1877.
*FIG. III.*
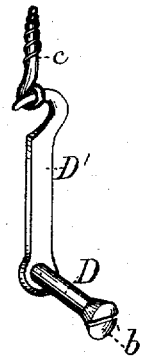
*FIG. IV.*
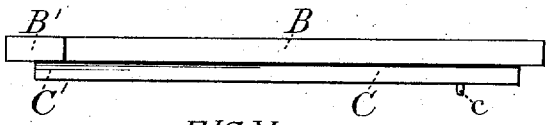
*FIG. V.*
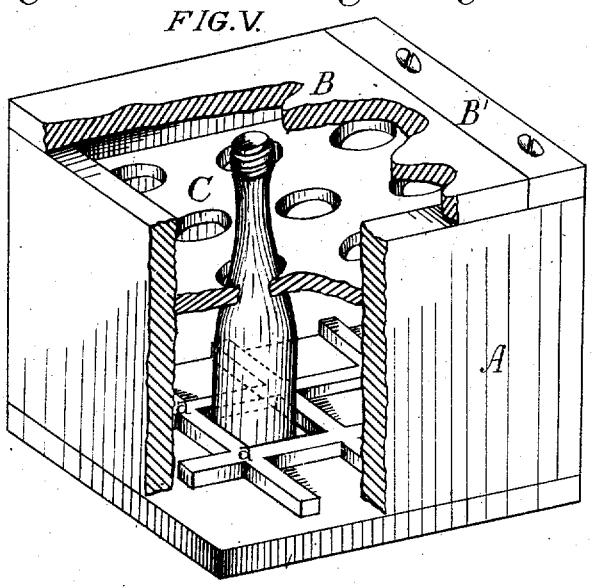
*WITNESSES:*
Chs E. Lewis.
Jno R Spedden
*INVENTOR:*
George Wilson
By Chas B. Mann
his Attorney

UNITED STATES PATENT OFFICE.

GEORGE WILSON, OF TOLEDO, OHIO.

IMPROVEMENT IN CASES FOR TRANSPORTING BOTTLES AND BOTTLED LIQUIDS.

Specification forming part of Letters Patent No. 182,784, dated October 3, 1876; Reissue No. 8,011, dated December 25, 1877; application filed December 5, 1877.

*To all whom it may concern:*

Be it known that I, GEORGE WILSON, of Toledo, in the county of Lucas and State of Ohio, have invented a new and useful Improvement in Cases for Transporting Bottles, Bottled Liquids, and other articles, which is fully set forth in the following specification and accompanying drawings, in which—

Figure 1 is a perspective view of the case closed, with one corner broken out, to show the manner of securing a bottle in place. Fig. 2 is a vertical section of case at *x x*. Fig. 3 is a perspective view of fastener. Fig. 4 is a side or edge view of the removable cover and fastener. Fig. 5 is a perspective view of case, showing the perforated board on the necks of the bottles.

The object of my invention is to provide an improved case for transporting bottled liquids and empty bottles without liability of breakage, and without isolating each bottle by filling the interstices with a loose packing material. And a further object is to provide an improved cover and fastener for cases that are designed to be used repeatedly for the shipment of articles requiring a case of special construction.

My invention will first be described in connection with the drawing, and then pointed out in claims.

The letter A represents a rectangular box just deep enough to contain the bottles to be transported. In the bottom is formed a separate socket or receptacle for the base of each bottle by nailing to the bottom crossed strips *a*, of wood. A narrow strip, B′, of the cover is permanently secured to the top of the box at one side or the back edge thereof. The remainder of the cover B has a board, C, secured to its under side, which projects into the box, and is elongated at the back edge of the cover, as shown at C′, so as to take under the strip B′, and thus secures the back of cover in its position on the box. If desired, the board C, previous to being secured to the cover, may have holes bored therein, which serve as sockets to receive and secure the mouths of the bottles.

Instead of boring holes in the board C, which is secured to the cover, a perforated holding board or follower may be dropped down on the necks of the bottles, and fastened by a nail driven over it into the side of the box, on two or four sides, to hold the bottles in place, while the cover may be simply nailed or otherwise secured to the box, and thus reduce the cost of the case and packing, as seen in Fig. 5.

By either arrangement herein described the bottles are held at both ends, their strongest parts, and can be safely transported without filling in with loose packing material.

For shipping-cases constructed and adapted for the shipment of some special articles, and designed to be repeatedly used, the covers are secured at the back edge by the elongated part C′ of the board affixed to the under side, and are secured at the front edge or sides, as preferred, by a screw eye or staple, *c*, pendent from the cover on the inner side of case, with which the hook D′ engages. The shank of the hook is secured to the inner end of a spindle, D, which passes through the side of case, having a head, *d*, like that of a wood-screw, countersunk on the outer side of case, whereby the hook may be turned by a screw-driver.

After the case is filled, and the cover fastened to the box, the shipper may paste a label containing the address of the consignee over the spindle-head, which label, if broken or torn before delivery, will indicate to the consignee the possibility of the case having been opened in transit.

The empty case may, in like manner, be returned to the shipper.

Having described my invention, I claim and desire to secure by Letters Patent—

1. In shipping-cases of special construction, that are designed to be repeatedly used, the elongated part *c′* of the board affixed to the under side of cover, and the strip B′, permanently attached to the case, whereby the cover is secured at the back edge, as shown and described, and for the purpose specified.

2. The cover-fastener consisting of an eye or staple, *c*, pendent from the cover on the inner side of case, and hook D′, mounted on a spindle, D, having a slotted head, *d*, countersunk on the outer side of case, substantially as described.

3. In a box or case having sockets or receptacles in the bottom, for the bottoms of the bottles, the perforated follower C, when adapted to be dropped upon the necks of bottles contained in the case, to secure them in position by nailing or otherwise holding it down, substantially as described.

GEORGE WILSON.

Witnesses:
CHARLES I. SCOTT,
JOHN W. LEE.